United States Patent
Ueda

(10) Patent No.: US 7,193,635 B2
(45) Date of Patent: Mar. 20, 2007

(54) PORTABLE TERMINAL, OVERLAY OUTPUT METHOD, AND PROGRAM THEREFOR

(75) Inventor: Eiji Ueda, Hiroshima-Ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 363 days.

(21) Appl. No.: 10/123,523

(22) Filed: Apr. 17, 2002

(65) Prior Publication Data

US 2002/0163592 A1 Nov. 7, 2002

(30) Foreign Application Priority Data

Apr. 18, 2001 (JP) .............................. 2001-118984

(51) Int. Cl.
*G09G 5/00* (2006.01)
(52) U.S. Cl. ...................... 345/629; 345/619
(58) Field of Classification Search ................ 345/629, 345/484–485, 589, 636, 638; 348/484–485, 348/589
See application file for complete search history.

(56) References Cited

U.S. PATENT DOCUMENTS

| | | | | |
|---|---|---|---|---|
| 4,847,696 A | * | 7/1989 | Matsumoto et al. | 386/83 |
| 5,325,183 A | | 6/1994 | Rhee | |
| 5,606,374 A | * | 2/1997 | Bertram | 725/37 |
| 5,638,090 A | | 6/1997 | Schnaitter et al. | |
| 5,671,436 A | * | 9/1997 | Morris et al. | 707/10 |
| 5,945,927 A | * | 8/1999 | Nakayama et al. | 340/995.14 |
| 6,011,592 A | | 1/2000 | Vaughan et al. | |
| 6,219,067 B1 | * | 4/2001 | Dieterich | 345/440 |
| 6,334,003 B1 | * | 12/2001 | Yokota | 382/313 |
| 6,424,426 B1 | * | 7/2002 | Henry | 358/1.15 |
| 6,542,471 B1 | * | 4/2003 | Ito | 370/252 |
| 6,704,027 B2 | * | 3/2004 | Nakano | 345/636 |
| 6,807,367 B1 | * | 10/2004 | Durlach | 386/125 |
| 2001/0015731 A1 | * | 8/2001 | Ono | 345/636 |
| 2001/0055017 A1 | * | 12/2001 | Ording | 345/440 |
| 2002/0018077 A1 | * | 2/2002 | Powlette | 345/744 |
| 2002/0059614 A1 | * | 5/2002 | Lipsanen et al. | 725/75 |
| 2002/0072047 A1 | * | 6/2002 | Michelson et al. | 434/307 A |
| 2002/0093923 A1 | * | 7/2002 | Bouet | 370/328 |
| 2002/0143738 A1 | * | 10/2002 | Miyakoshi et al. | 707/1 |

FOREIGN PATENT DOCUMENTS

| | | |
|---|---|---|
| EP | 0 627 849 A1 | 12/1994 |
| EP | 0 907 098 A1 | 4/1999 |
| JP | 05-150929 | 6/1993 |
| JP | 08-251503 | 9/1996 |
| JP | 2000-101914 A | 4/2000 |
| JP | 2000-224581 A | 8/2000 |
| JP | 2001-060080 | 3/2001 |
| JP | 2001060080 | 3/2001 |
| JP | 2001069235 A * | 3/2001 |
| JP | 2002213972 A * | 7/2002 |

OTHER PUBLICATIONS

Shioka, Kozue. "Watching movies or listening music through Internet." Japan, D-ART Co. Ltd., Feb. 28, 1998, First Edition, pp. 78-81 and 99-104, 148-150.

(Continued)

*Primary Examiner*—Ulka Chauhan
*Assistant Examiner*—Eric Woods
(74) *Attorney, Agent, or Firm*—McDermott Will & Emery LLP

(57) ABSTRACT

A portable terminal allows the user to flexibly and readily change an overlay output distribution for reproduced data in accordance with the user's taste and can automatically control the overlay output distribution in accordance with a surrounding environment. A setting means sets output parameters which are parameters related to reproduced data output for each reproduced data. A data output control means processes each of the reproduced data based on the output parameters set by the setting means and outputs the processed output data.

5 Claims, 13 Drawing Sheets

OTHER PUBLICATIONS

Konishi, Kouji., et al. "Technical Test Labs vol. 109 DOS/V magazine" Softbank Publishing Co., Ltd. Nov. 1, 1999, vol. 8, No. 21, pp. 137-149.

Yamaguchi, "The newest software DVD decoder 3 types." ASCII DOS/V Magazine, ASCII Corporation, Sep. 1, 1999, vol. 5, No. 9, pp. 266-267.

* cited by examiner

FIG. 4

| SET NAME | AUDIO DATA (BROADCASTING) (VOLUME, SOUND QUALITY) | VIDEO DATA (BROADCASTING) (LUMINANCE, COLOR) | CHARACTER DATA (BROADCASTING) (LUMINANCE, COLOR) | NETWORK DATA (INTERNET) (LUMINANCE, COLOR) |
|---|---|---|---|---|
| INITIAL VALUE | $\alpha = (1.0, 1.0)$ | $\beta = (1.0, 1.0)$ | $\gamma = (1.0, 1.0)$ | $\delta = (1.0, 1.0)$ |
| TV | $\alpha = (1.3, 1.0)$ | $\beta = (1.3, 1.0)$ | $\gamma = (1.3, 1.0)$ | $\delta = (0.7, 1.0)$ |
| ELECTRONIC MAIL | $\alpha = (0.5, 1.0)$ | $\beta = (0.5, 1.0)$ | $\gamma = (0.5, 1.0)$ | $\delta = (1.5, 1.0)$ |
| ... | ... | ... | ... | ... |
| ... | ... | ... | ... | ... |
| ... | ... | ... | ... | ... |
| INDOORS | $\alpha = (1.0, 1.0)$ | $\beta = (0.6, 1.0)$ | $\gamma = (0.6, 1.0)$ | $\delta = (0.6, 1.0)$ |
| OUTDOORS | $\alpha = (1.0, 1.0)$ | $\beta = (1.5, 1.0)$ | $\gamma = (1.5, 1.0)$ | $\delta = (1.7, 1.0)$ |

PORTABLE TERMINAL, OVERLAY OUTPUT METHOD, AND PROGRAM THEREFOR

BACKGROUND OF THE INVENTION

1. Field of the Invention

The present invention relates to a portable terminal, and more particularly to a portable terminal which can reproduce simultaneously a plurality of contents each including at least one of video data, audio data and character data, an overlay output method, and a program therefor.

2. Prior Art of the Invention

In recent years, the Internet has been increasingly utilized by mobile portable terminals represented by a cellular phone. On the other hand, data broadcasting services are becoming more popular through the digitization of program broadcasting. Thus, there is a need for a mobile terminal which can utilize both the program broadcasting services and the Internet in a mobile environment.

A mobile terminal adapted to receive contents from a plurality of such information sources may reproduce simultaneously a plurality of types of reproduced data, i.e., contents exemplified by video (moving image data), data broadcasting (character data), audio (audio data), electronic mail (character data, still image data, moving image data, audio data), home page (character data, still image data, moving image data, audio data) and the like, and may also reproduce simultaneously a plurality of contents. However, since the portable terminal is made small in size for placing prime importance on the portability, it has a small display screen for displaying the contents. For this reason, it is not practical to display a plurality of contents using a plurality of windows on the display screen of the portable terminal, as is the case with a standstill television. Also, when a plurality of contents are displayed using a plurality of windows, complicated display switching manipulations are required for referencing many contents. However, it is probably very difficult to switch a plurality of displays during a movement.

A method of referencing a plurality of contents without complicated display switching is an overlay display which displays a plurality of contents (reproduced data) overlaid on a single screen. For example, when character data is overlaid on a television broadcast (video data), both data can be simultaneously referenced. A conventionally known method of overlaying character data on a television broadcast is an OSD (Oh Screen Display) system.

However, since simply overlaying character data on a video data results in difficulties in viewing both data, a proposal has been made on a distribution of respective reproduced data outputs for use in the overlay display in the OSD system.

On the other hand, techniques described in Laid-open Japanese Patent Application No. 2001-60080 store the luminance and contrast of a display device, when adjusted by the user, as well as the temperature, brightness and the like in surroundings, such that the luminance and contrast can be automatically adjusted from then on in accordance with a use situation (temperature and brightness). In this way, even if the use environment is changed, it is possible to realize a display condition highly visible for the user, i.e., highly visible luminance and contrast. This document also describes that an ID (identification information) given to each display unit (liquid crystal) is judged in addition to the temperature and brightness, such that the display condition is modified based on the ID of the display unit when it is replaced due to a repair or the like.

However, the conventional overlay display, though incorporating techniques for making a display itself more visible, has a problem in that a distribution of respective output parameters for reproduced data outputs is fixed so that each user is not allowed to flexibly change the distribution of overlay display in accordance with his taste.

For example, reproduced data to be mainly viewed or heard from overlaid information varies in occasion depending on the user's taste, type of information and the like. Specifically, assume that an electronic mail, a video data and an audio corresponding to the video data are overlaid. When the user wishes to mainly reference the electronic mail, it is readily supposed that the user will feel video data as obstructive if the video data are prominent more than necessary, and will also feel the audio as offensive. In this event, the user will think that he wants to reduce the luminance of the displayed video data recognizably, and wants to reduce or mute the audio.

However, when the user wishes to reference the video data at the next instance, the overlaid electronic mail will be regarded as obstructive, and the audio will be too small for the user to hear.

In this way, since which information (content) is mainly viewed, or to which degree of attention distribution should be set for viewing varies from time to time depending on a use environment of the user, and the like, troubles may occur when the user reproduces data if overlay output distribution settings are fixed among respective reproduced data or among respective contents.

In this regard, while the aforementioned Laid-open Japanese Patent Application No. 2001-60080 describes the technique for automatically changing the luminance and contrast in accordance with a use environment, this technique does not change the overlay output distribution settings among respective reproduced data or among respective contents. Therefore, the user is not allowed to freely set the overlay output distribution for reproduced data (content) mainly viewed by the user and reproduced data (content) not mainly viewed.

In the present invention, simultaneous reproduction of a plurality of audio data is also defined as an overlay output, together with the overlay display.

SUMMARY OF THE INVENTION

The present invention has been made in view of the circumstance in the prior art, and it is an object of the invention to provide a portable terminal which is capable of allowing each user to flexibly and readily change an overlay output distribution for reproduced data and of automatically controlling the overlay output distribution in accordance with a surrounding environment, an overlay output method, and a program therefor.

The present invention comprises the following means for achieving the above object. Specifically, the present invention is premised on a portable terminal for simultaneously reproducing a plurality of contents each including at least one of video data, audio data and character data which are reproduced data. Here, a setting device sets an output parameter which is a parameter related to an output of the reproduced data for each of the reproduced data, and data output control device processes each of the reproduced data based on the output parameters set by the setting device and outputs the processed reproduced data.

Therefore, the user can arbitrarily set an overlay output distribution for the reproduced data (video data, audio data, character data) in accordance with his taste.

In one configuration, when the setting device changes an output parameter related to predetermined reproduced data, the setting device also changes an output parameter related to reproduced data corresponding to the predetermined reproduced data.

Here, for example, when one reproduced data output is increased (changed) while another reproduced data output is decreased (changed), assuming that two types of contents, for example, are being reproduced, the output of the other content (a content which need not be mainly viewed) can be automatically reduced in response to an increase in the output of the content which is desired to be mainly viewed.

Also, when one reproduced data output is increased (changed) while another reproduced data output is also increased (changed), for example, when an output of video data of one content is increased, an output of audio data which is reproduced data of the same content can be increased. In the foregoing manner, efficient manipulations can be provided for changing the overlay output distribution.

Further, in one configuration, when the reproduced data constitutes a pull-type content, the setting device changes an output parameter such that during acquisition of the content, an output of reproduced data constituting the content is reduced.

In this configuration, it is possible to draw the user's consciousness to a content that is different from the content which is being acquired, thereby reducing uncomfortableness of the user to a waiting time required to acquire the pull-type content.

Further, when the output parameters are changed such that the output of reproduced data constituting the pull-type content is increased in accordance with the pull-type content receiving situation, it is possible to notify the user of the content receiving situation utilizing the output as well as to reduce the uncomfortableness of the user to a waiting time.

Further, in one configuration, the portable terminal further includes reservation device for storing a time at which a predetermined content is reproduced, and timer device for monitoring the reproducing time stored in the reservation device, wherein the setting device receives notification of arrival of the reproducing time from the timer device to change an output parameter so as to increase the output of the reproduced data constituting the corresponding predetermined content.

Likewise, in this configuration, since the output parameter can be changed in accordance with a predetermined time, it is possible to provide efficient manipulations for changing the overlay output distribution.

Further, in one configuration, the portable terminal further includes parameter storage device for storing the set output parameter, wherein the setting device writes and reads an output parameter into and from the parameter storage device.

In the foregoing configuration, output parameters suitable for each situation are previously stored in the parameter storage device to allow the user to use the output parameters, so that the user can readily set suitable output parameters for reproduced data.

Also, when the output parameters related to the video data include luminance and/or color, the luminance of particular video data can be changed, so that video data and character information can be overlaid in accordance with the user's taste, i.e, the preference of the user.

Further, in other configurations, the setting device sets an output parameter based on information acquired from a broadcasting data decoder, or based on information acquired from a network decoder.

In the foregoing configurations, it is possible to distribute a large amount of defined output parameters at one time through broadcasting, as well as to control the user's display based on an intention of the broadcasting transmission side.

Further, in one configuration, the setting device sets an output parameter based on information stored in an external storage medium.

In the foregoing configuration, the user can transmit, receive and distribute output parameters by storing preferred output parameters in the memory card, and passing the memory card to other persons.

Further, in one configuration, the portable terminal includes a scanner, wherein the setting device sets an output parameter based on information read from a printed medium through the scanner.

In the foregoing configuration, it is possible to readily input output parameters printed, for example, on a printed matter.

Further, in one configuration, the portable terminal includes a GPS, wherein the setting device sets an output parameter based on positional information acquired from the GPS.

In the foregoing configuration, the setting device can compare, for example, the positional data acquired from GPS with positional data of a predetermined region, and change a "luminance" parameter and a "color" parameter of the information particular to a region, when determining that the user is located within the positional data of the predetermined region, thereby prominently displaying the information particular to the region.

Further, in one configuration, the portable terminal includes an optical sensor, wherein the setting device sets an output parameter based on brightness information acquired from the optical sensor.

In the foregoing configuration, by changing the "luminance" parameter and the "color" parameter based on the data related on the brightness acquired from the optical sensor, it is possible to automatically display an overlay which is easy for the user to perceive.

Further, in one configuration, the setting device sets an output parameter based on speed information which is a moving speed of the portable terminal.

In the foregoing configuration, it is possible to operate the portable terminal such that the volume of audio data is kept constant, and displayed video data and character data on the display unit are faded out as the moving speed becomes higher to prevent dangerous inattentive driving.

The present invention can be provided as a program which is individually distributed through telecommunication lines and the like. In this case, a control unit including a central processing unit (CPU), not shown, implements a control operation in cooperation with respective circuits other than the CPU in accordance with a program of the present invention. However, each device implemented by using the program and the CPU may be provided using dedicated hardware. Also, the program may be distributed as recorded on a computer readable recording medium such as CD-ROM.

BRIEF DESCRIPTION OF THE DRAWINGS

FIG. 4 is exemplary settings for defined output parameters;

DESCRIPTION OF THE PREFERRED EMBODIMENTS

In the following, several embodiments of the present invention will be described with reference to the accompanying drawings for serving the understanding of the invention. It should be understood that the following embodiments are mere examples in which the present invention is embodied, and do not in nature limit the technical scope of the invention.

The content, referred to in the present invention, is reproduced data, i.e., information including at least one of video data, audio data and character data, and a television broadcasting, data broadcasting, audio, electronic mail, home page and the like fall under the contents. The video data includes still image data and moving image data.

First Embodiment

Figure 1:
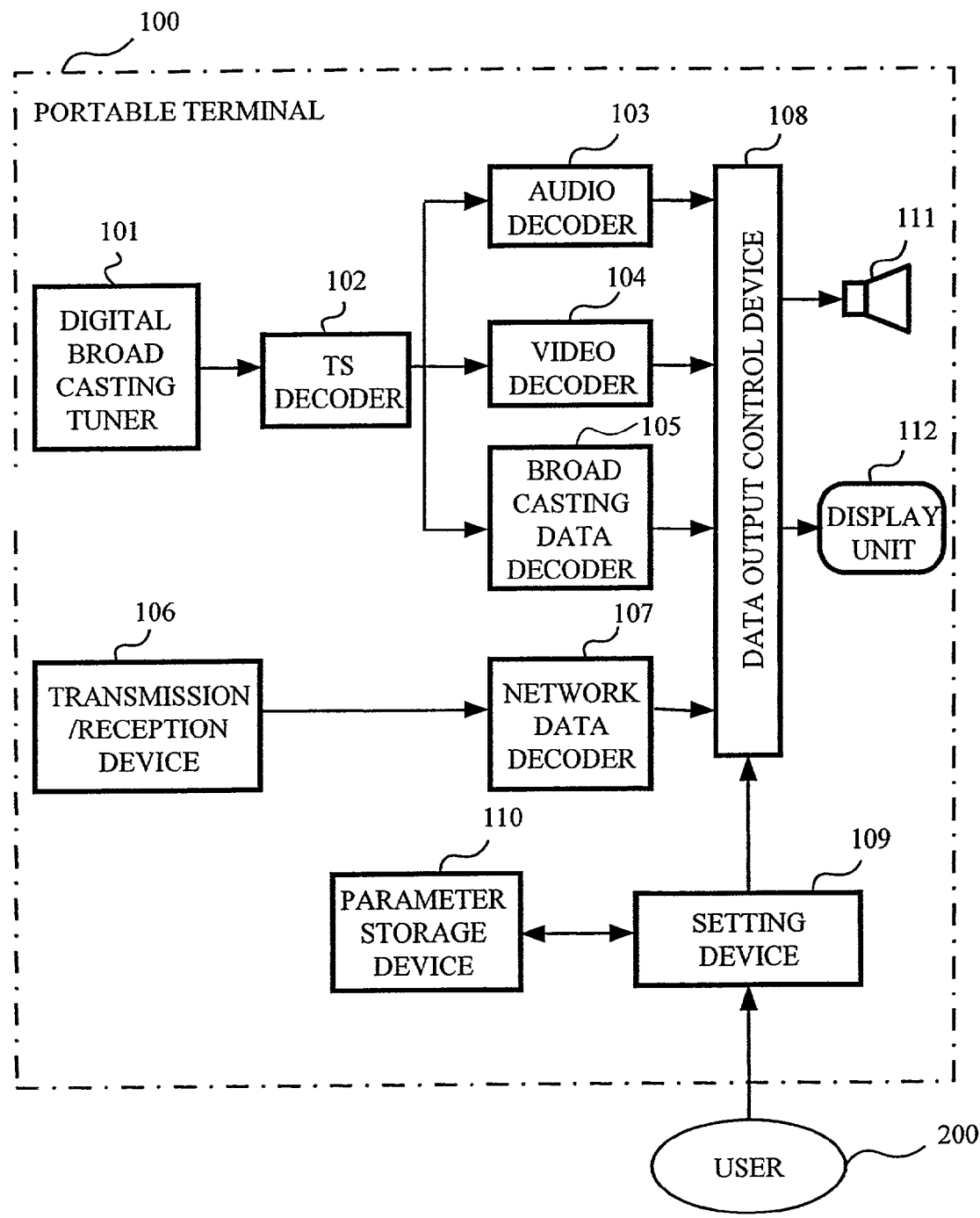
FIG. 1 is a general functional block diagram of a portable terminal in one embodiment.

A portable terminal according to the present invention will be described below with reference to FIGS. 1, 2, 3, 4, 5. FIG. 1 is a functional block diagram generally showing the portable terminal in the first embodiment.

Figure 5:
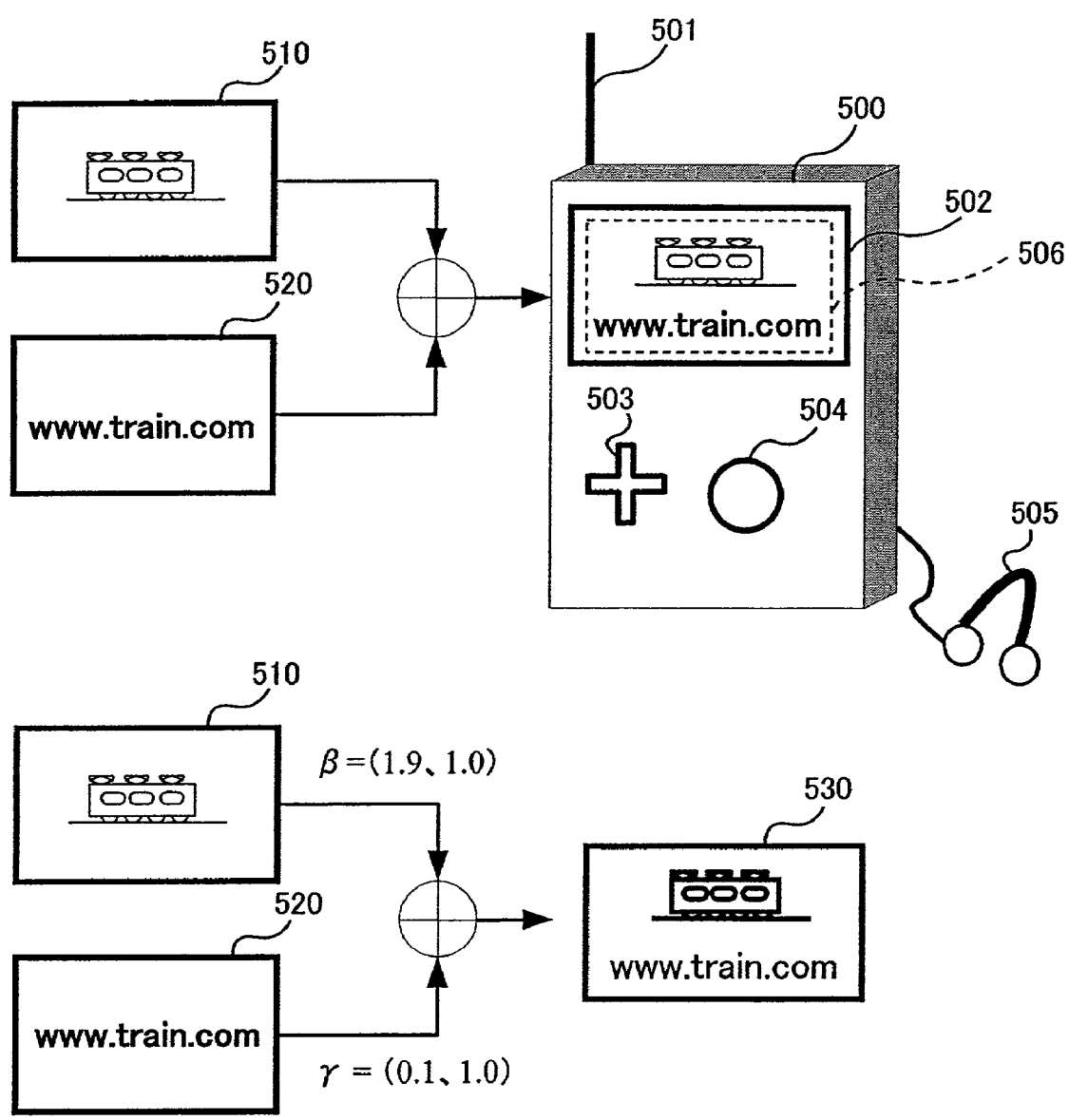
FIG. 5 is an image diagram for describing an overlay display.

First, the configuration of the portable terminal will be described in the first embodiment. A portable terminal 500 in FIG. 5 shows an exemplary appearance of a portable terminal 100 in FIG. 1. The portable terminal 500 includes an antenna 501 for receiving digital broadcasting (television broadcasting) and accessing a radio network; a display (display unit) 502 for displaying digital broadcasting and network data as required; a cross key 503 for receiving an indication of up, down, left and right from the user; an information acquisition key 504; and a terminal (not shown) for outputting audio. In the example of FIG. 5, the terminal for outputting audio is connected to a headphone 505.

Referring to FIG. 1, the portable terminal 100 includes, for example, a digital broadcasting tuner 101; and a transmission/reception device 106 for transmitting/receiving data through a network such as the Internet, and can transmit and receive digital broadcasting, a home page on the internet, an electronic mail and the like through the antenna 501. However, a plurality of inputs are not necessarily required, and the portable terminal 100 may include only the transmission/reception device 106, for example, such that the transmission/reception device 106 receives both digital broadcasting and an electronic mail through a network.

In the following, the processing for overlaying video data and character data on the display 502 will be specifically described with reference to FIGS. 1, 2, 3, 5.

Assume herein that the video data 510 shown in FIG. 5 is a moving image which represents a train, and the broadcasting data 520 is character data which includes a character string of URL (Uniform Resource Locator) indicative of the location at which the video data 510 is stored. In this event, while the video data and the character data form the same content, the video data and the character data can be defined as separate contents when the character data, for example, is received independently (character broadcasting). The moving image representing the train is updated over time, and in the example of FIG. 5, exemplary data and exemplary display are merely shown at a certain time.

Figure 2:
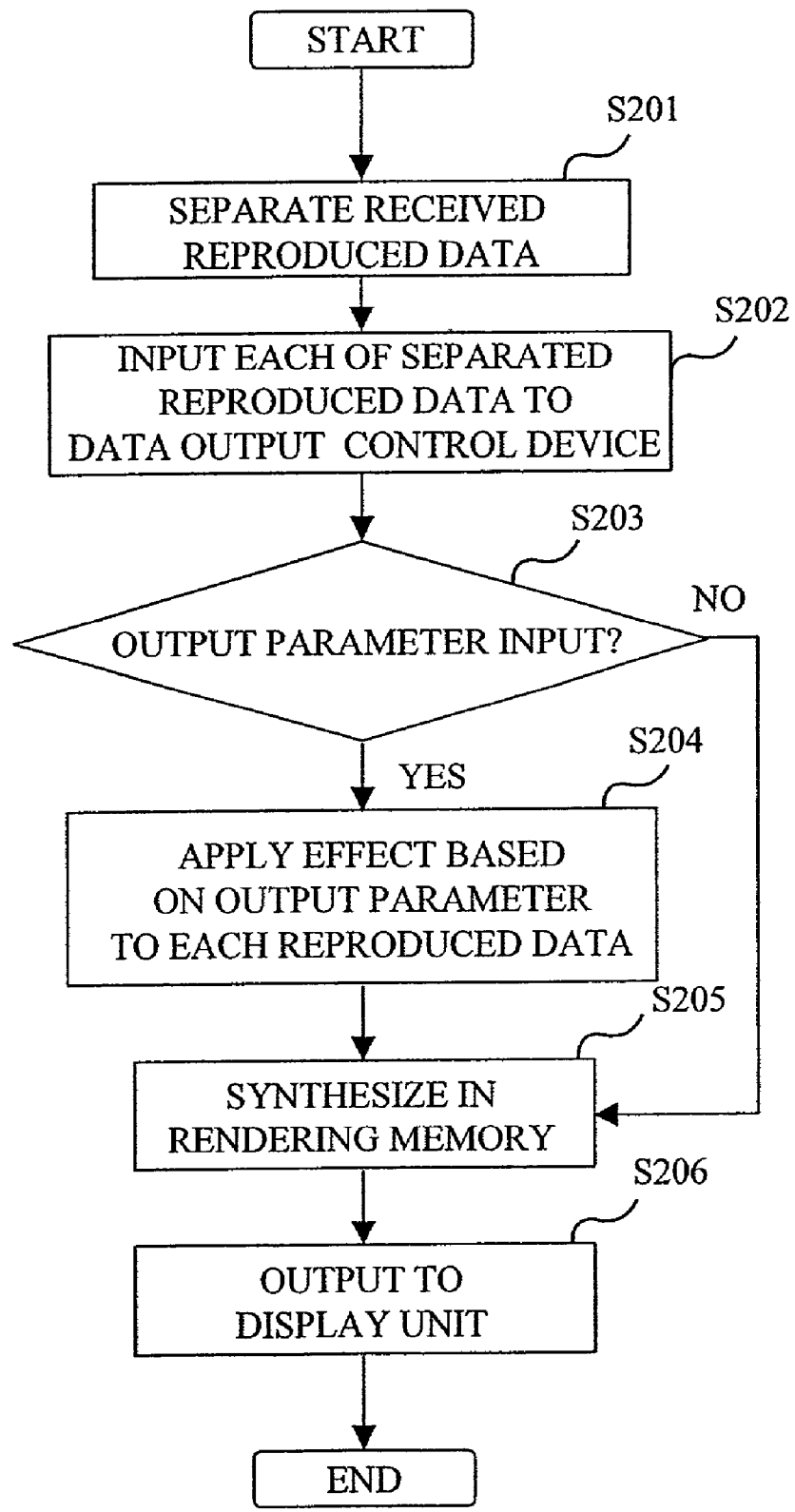
FIG. 2 is a flow chart showing processing of the portable terminal according to the present invention.

First, a content including video, audio, characters and the like, received by a digital broadcasting tuner 101 through the antenna 501 as multiplexed data is de-multiplexed into respective reproduced data (video data, audio data, character data) by a TS (Transport Stream) decoder 102 (S201 in FIG. 2).

Next, the video data in the de-multiplexed reproduced data is input to a video decoder 104; the audio data to an audio decoder 104; and the character data to a data decoder 105, and the respective data are converted into reproducible formats by the respective decoders 103–105, and transmitted to a data output control device 108 (S202 in FIG. 2).

Figure 3:
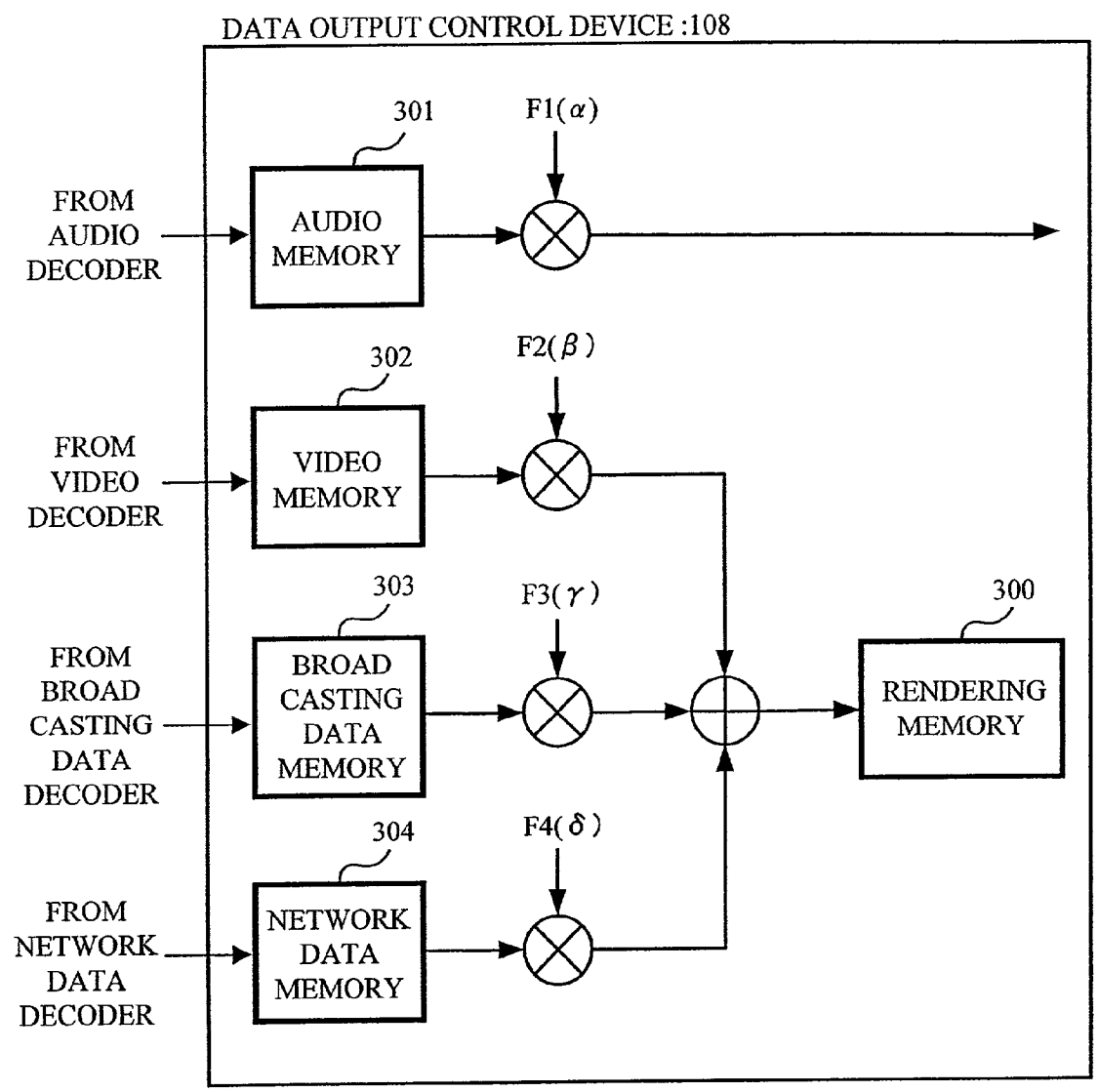
FIG. 3 is a diagram showing output parameters and a storage image of the output parameters.

Subsequently, as shown in FIG. 3, each of the reproduced data transmitted to the output control device 108 is received respectively, the reproduced data from the audio decoder is received by an audio memory 301; the reproduced data from the video decoder 104 by a video memory 302; and the reproduced data from the broadcasting decoder 105 by a broadcasting data memory 303.

The reproduced data received by the transmission/reception device 106 is converted to a reproducible format by a network decoder 107, and transmitted to the data output control device 108. Here, the reproduced data received by the transmission/reception device 106 may be reproduced data in a variety of formats such as audio data, video data, character data and the like. Here, the reproduced data is treated as character data.

The reproduced data (audio data, video data, character data, network data) input to the portable terminal 100 are transmitted to the data output control device 108, they are stored in the audio memory 301, the video memory 302, the broadcasting data memory 303, and the network data memory 304, respectively, and they are overlaid and once stored in a rendering memory 300 (No at S203→S205 in FIG. 2). The reproduced data are applied with specific effects by functions F1 (X), F2 (X), F3 (X), F4 (X) having output parameters as a group of variables before they are stored in the rendering memory 300, details of which will be described later.

The reproduced data (for display) stored in the rendering memory 300 is displayed on the display unit 112 (display 502). However, the audio data is directly output from the audio memory 301 without being overlaid, but the audio data is also overlaid when the audio data is included, for example, in network data.

A display 506 shows an example in which the video data 510 and the broadcasting data 520 are overlaid and displayed on the display unit 112.

The foregoing is a general processing method in an overlay output. In the present invention, the output parameters can be set independently for the reproduced data. In the following, the processing for setting the output parameters will be described in detail.

Here, the output parameter is a group of variables for applying specific effects to output data as shown in FIG. 4. In the embodiment 1, "volume", "sound quality" and the like fall under the output parameters of the audio data; "luminance", "color" and the like fall under the output parameters of the video data and the character data. Either of the output parameters for the respective reproduced data are set "1.0" as indicated by an initial value 401 in FIG. 4 when the reproduced data are displayed on the display 112 as they are input without being applied with specific effects.

When the user utilizing the portable terminal 100 views the display unit 112 with an intention to prefer the digital broadcasting, the user uses the cross key 503, for example, to perform a manipulation for increasing the luminance of the display associated with the digital broadcasting (broadcasting data 400). Specifically, this manipulation may be, for example, a manipulation of pressing down "up" of the cross key 503. As the "up" of the cross key 503 is pressed down, a setting device 109 increases a luminance parameter 403 for the video data by "0.1".

In addition, a luminance parameter 404 for the character data and a volume parameter 405 for the audio data, both data belongs to the same which video data belongs to, may be increased associated with the luminance parameter 403. Furthermore, a luminance parameter 402 for the reproduced data other than the broadcast data 400 (here, network data) may be reduced by "0.1" associated with the manipulation of increasing the luminance parameter 403 for the video data.

The respective parameters changed by the setting device 109 in the foregoing manner are transmitted to the data output control device 108.

Next, the processing of the data output control device, which has received the respective reproduced data and the respective parameters, will be described in detail.

The data output control device 108, upon receipt of the output parameters $\alpha$, $\beta$, $\gamma$, $\delta$ associated with the video data, the audio data, the character data and the network data, performs specific effects on the respective reproduced data using, for example, specific functions F1 (volume, sound quality), F2 (luminance, color), F3 (luminance, color) and F4 (luminance, color) (Yes at S203→S204 in FIG. 2). Specifically, as shown in FIG. 3, for example, an effect derived from F1 ($\alpha$) is applied to the audio data once stored in the audio memory 301, and an effect derived from F2 ($\beta$) is applied to the video data stored in the video memory 302.

Here, giving a concrete example, the foregoing function F2 ($\beta$) is a function for applying a specific effect to video data based on the luminance and color. For example, when the output parameter $\beta$ is (1.9, 1,0), F2 ($\beta$) applies an effect of enhancing the luminance higher than that when the video data stored in the video memory 302 is reproduced as it is. An image 530 in FIG. 5 shows an image when the luminance of the video data 510 is increased, and the luminance of the broadcasting data 520 is reduced. The user can concentrate on the video data since the video data (train) is more prominent whereas the broadcasting data (URL) is less prominent. When the color parameter is set, for example, to "0.0", the video data is changed, for example, to black and white, or to a sepia tone, based on the values.

When F1 ($\alpha$) with the output parameter $\alpha$=(1.9, 1.0) substituted into the aforementioned F1(X) is applied to reproduced data stored in the audio memory 301, the volume is increased than that when the audio data is reproduced as it is ($\alpha$=(1.0, 1.0)). Also, when any value is set in the sound quality parameter, the quality of the audio signal is changed based on the value.

In a similar manner to the foregoing, an effect given by F3($\gamma$) is applied, for example, to the character data stored in the broadcasting data memory 303, and an effect given by F4($\delta$) is applied, for example, to the network data stored in the network data memory 304.

The audio data applied with a specific effect in the data output control device 108 is output from a speaker 111 (headphone 505). Data related to a display applied with a specific effect, i.e., here, the video data, the character data and the network data are once synthesized (i.e., overlaid) in the rendering memory 300, and output to the display unit 112 (S205→S206 in FIG. 2).

In the foregoing manner, the output parameters $\alpha$–$\delta$ which are input values for determining the values of the functions F1–F4 can be set by indicating the upward and downward directions of the cross key 503. Therefore, the user can arbitrarily set an overlay distribution for the user's preferred video data, audio data, character data and network data by manipulating the cross key 503 up and down. Also, since the luminance can be changed for particular video data, the video data can be overlaid on character data in accordance with the preference of the user's taste, i.e., viewing and listening.

Alternatively, for example, the user may directly change $\beta$ and $\gamma$, by providing an output parameter $\beta$={$\beta$i; i=1, 2, ..., n} for the video data stored in the video data memory 302, and an output parameter $\gamma$={$\gamma$i; i=1, 2, ..., n} for the broadcasting data stored in the broadcasting data memory 303 (here, i is the number of parameters).

In this event, for example, assuming $\beta$i+$\gamma$i=1, and $0 \leq \beta i \leq 1$, and $0 \leq \gamma i \leq 1$, if $\beta i \rightarrow 1$ then $\gamma i \rightarrow 0$. In other words, by making the video data 510 more prominent, the overlay output may be changed such that the broadcasting data 520 is automatically made less prominent.

On the contrary, if $\beta i \rightarrow 0$ then $\gamma i \rightarrow 1$, the overlay output is changed to automatically make the video data 510 less prominent by making the broadcasting data 520 more prominent.

The mobile terminal according to the present invention may use any scheme for a modulation, a multiplexing, an error correcting of broadcast video data, audio data, character data and the like. The same is true for the format of data transmitted and received through the transmission/reception device 106.

The output parameters aforementioned $\alpha$, $\beta$, $\gamma$, $\delta$ are output parameters which form part of functions for providing the audio output effect and the image output effect intended by the present invention, and they are related to one another. Alternatively, they may be set independently of one another.

Also, the output parameters $\alpha$, $\beta$, $\gamma$, $\delta$ are not limited to the aforementioned two output parameters, and may be included of a plurality of parameters other than the foregoing.

It should be understood that the values of the output parameters are illustrative and the output parameters may take any values.

Further, in the first embodiment, the user manipulates the portable terminal 500 using the cross key 503. The manipulation using the cross key, however, is not directly related to the present invention. In other words, this simply represents the description on the manipulation. Therefore, details on a procedure for selecting each of the output parameters is omitted. A method of selecting each output parameter may presumably involve, for example, once displaying a menu, selecting an output parameter by the user selecting the menu, and changing the output parameter using the cross key. However, such a method is not particularly limited. Assume also that in the following embodiments, the manipulations using the cross key are shown in a simple manner.

Second Embodiment

In a second embodiment, another application example is used for serving the understanding of the present invention, in addition to the aforementioned first embodiment with reference to FIGS. 3 to 5.

First of all, an embodiment will be described, where "update frequency" is provided in addition to "luminance" and "color" which are output parameters associated with the video data and character data (see FIG. 4). The "update frequency" parameter can be applied when video data is a moving image data. Specifically, for example, define the output parameter β as (luminance, color, update frequency). The "update frequency" parameter is a reproducing speed for moving image data upon receipt, and default value of the "update frequency" parameter is set to "1.0". Here, as shown in the aforementioned embodiment 1, the user can arbitrarily change the "update frequency" parameter by pressing down the "up" and "down" of the cross key 503. When the value of the "update frequency" parameter is set to "0.0", the function F2(β) acts to stop the moving image of the train (video data 510), and when the value of the "update frequency" parameter is set to "0.5", the function F2(β) acts to reproduce at a speed one-half of a normal speed.

By using the foregoing "update frequency" parameter, data other than a moving image data, i.e., character data such as broadcasting data, network data and the like can be made more visible by stopping or feeding frame by frame a screen of changing video data. Furthermore, by stopping broadcasting data which is changing in a similar manner to the foregoing, the video data can be made more visible.

In this event, the video data may be stopped by pressing down the "right" of the cross key 503, or the broadcasting data may be stopped by pressing down the "left" of the cross key 503. In addition, stopped video data can be released from stopping by again pressing down the "right" of the cross key 503. Similarly, the stopped broadcasting data can be released from stopping by again pressing down the "right" of the cross key 503.

Describing with reference to the example of FIG. 5, the video data 510 of a train and the broadcasting data 520 of URL characters of "www.train.com" are simultaneously broadcast and overlaid on the display 502. Both the video data 510 of the train and the broadcasting data of the URL characters vary over time, and the user can simultaneously refer to both of the video data 510 and the broadcasting data 520 in an overlay output distribution matched to an attention distribution of the user by manipulating the cross key 503 in the upward and downward directions. Also, the user can arbitrarily stop the video data 510 and the broadcasting data 520 by manipulating the cross key 503 in the left and right directions.

Also, in this event, the output of audio data can be controlled to be larger or smaller in accordance with the display of the video data 510 or the broadcasting data 520. Alternatively, the audio data can be controlled independently of the display of the video data 510 or the broadcasting data 520.

For matching with the display of the video data 510, the function F2(β) for applying an effect to the video memory 302, described above, is made proportional to the function F1(α) for applying an effect to the audio memory 301, thereby increasing the television sound associated with the video data 510 when the video data 510 is made more prominent, and reducing the sound associated with the video data when the broadcasting data 520 is more prominently displayed.

Third Embodiment

The second embodiment has shown an example of overlay output between the video data 510 broadcast from a broadcasting station, and the broadcasting data 520 simultaneously broadcast associated with the video data 510, i.e., between reproduced data which form part of the same content. In a third embodiment, description will be made on an overlay of network data acquired through a network on video data 510.

In a data broadcasting service in the digital broadcasting, URL data associated with a program, such as that shown by the broadcasting data 520 in FIG. 5 can be broadcast. The portable terminal 100 according to the present invention includes the transmission/reception device 106 shown in FIG. 1, so that the portable terminal 100 can acquire broadcast URL data and display a home page on WWW (World Wide Web) indicated by the URL.

Figure 6:
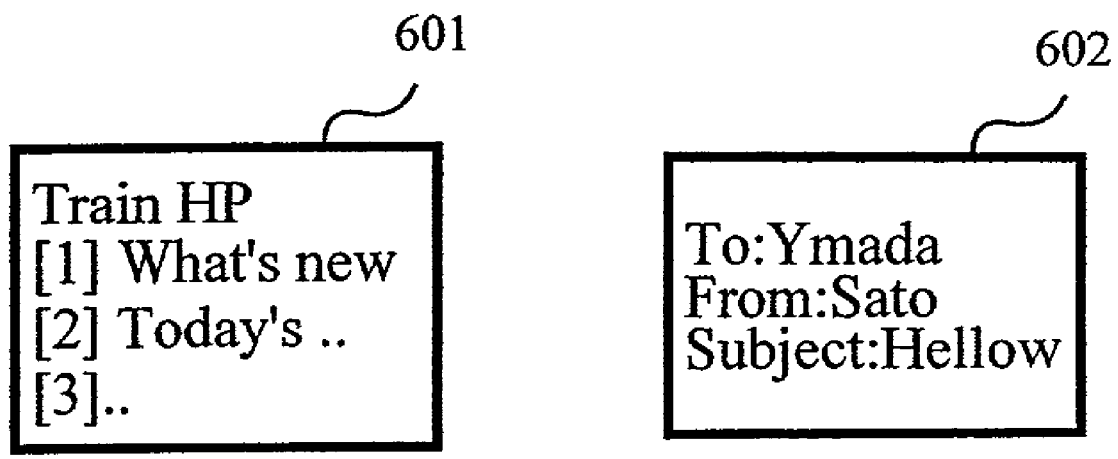
FIG. 6 is an example of home page data and electronic mail data.

While in the example of FIG. 5, the broadcasting data 520 is a character string of "www.train.com", assume herein that URL data indicative of the contents of the character string is simultaneously broadcasted as the broadcasting data 520. The user acquires home page data 601 (FIG. 6) indicated by "www.train.com" through the transmission/reception device 106 by pressing down an information acquisition key 504 on the portable terminal 500, and stores the home page data 601 in a network data memory 304 through the network data decoder 107. The contents of the network data memory 304 are synthesized with the contents of the video data memory 302 in the rendering memory 300, and overlaid on the display 502 of the portable terminal 500.

Here, the user can arbitrarily change an overlay output distribution by a similar device to the overlay output of the video data 510 and the broadcasting data 520 described above. Likewise, in this event, audio data output (the "volume" parameter) can be controlled to be larger or smaller in accordance with the display of the video data 510 or the home page data 601. While the example of FIG. 5 shows the home page data 601 which is character data, the home page data 601 may be video data, i.e., still image data or moving image data.

In the foregoing example, the video data 510 broadcasted from a broadcasting station is overlaid on the home page data 601 which is a network data acquired through a network. Alternatively, the home page data 601 may be replaced with electronic mail data 602 (see FIG. 6).

Generally, when the user refers to a home page or an electronic mail, the user should pay much attention to it. For this reason, no overlay output is produced in this event, such that the user refers only to the home page or the electronic mail. However, when the user browses a home page or an electronic mail for an instance while he is viewing a television program, he wants a trigger for returning to viewing the television program. Thus, audio data may be output independently without displaying video data, so that the user can return to view the video data (television program) relying on the sound.

In the foregoing example, the video data 510 and the broadcasting data 520; the video data 510 and the home page data 601; and the video data 510 and the electronic mail data 602 are combined for overlaid data. Alternatively, a combination of the broadcasting data 520 and the home page data 601, the broadcasting data 50 and the electronic mail data 602, or the home page data 601 and the electronic mail data 602, or a combination with audio data is also possible.

While program broadcasting is supposed for digital broadcasting, radio broadcasting or broadcasting through the Internet is also possible.

As described above, with the portable terminal 100 according to the present invention, the user can arbitrarily change an overlay output distribution among a variety of contents such as between broadcast video data or audio data and broadcasting data, or between broadcast video data or audio data and home page data or electronic mail data acquired through a network and the like.

In addition, the audio data output can be controlled to be larger or smaller in accordance with a display (output) of video data or home page data or electronic mail data, or can be controlled independently of the display of the video data or the home page data or the electronic mail data.

Thus, the user can arbitrarily change the overlay output distribution in the portable terminal which has a limited display capability to effectively receive a program broadcasting service and an Internet service.

Fourth Embodiment

Next, an example of dynamically changing the output parameters for reproduced data in accordance with a reproduced data acquisition situation will be described with reference to FIGS. 7 through 10.

For example, a home page and an electronic mail acquired by the terminal through the Internet or the like are pull-type contents. Specifically, the pull-type content is a content acquired spontaneously by the portable terminal from another terminal, when the user gives any instruction to the portable terminal. Also, reproduced data constituting a pull-type content is pull-type data.

For acquiring the pull-type content, a waiting time is taken from the time the user issues an instruction to the time all pull-type data has been acquired, unlike a video image. As this waiting time is longer, the user is obliged to pass a more useless time, so that it can be readily supposed that the user will feel uncomfortable.

For this reason, in the fourth embodiment, when the pull-type content is acquired, output parameters associated with the data are changed to reduce the uncomfortableness of the user.

Figure 9:
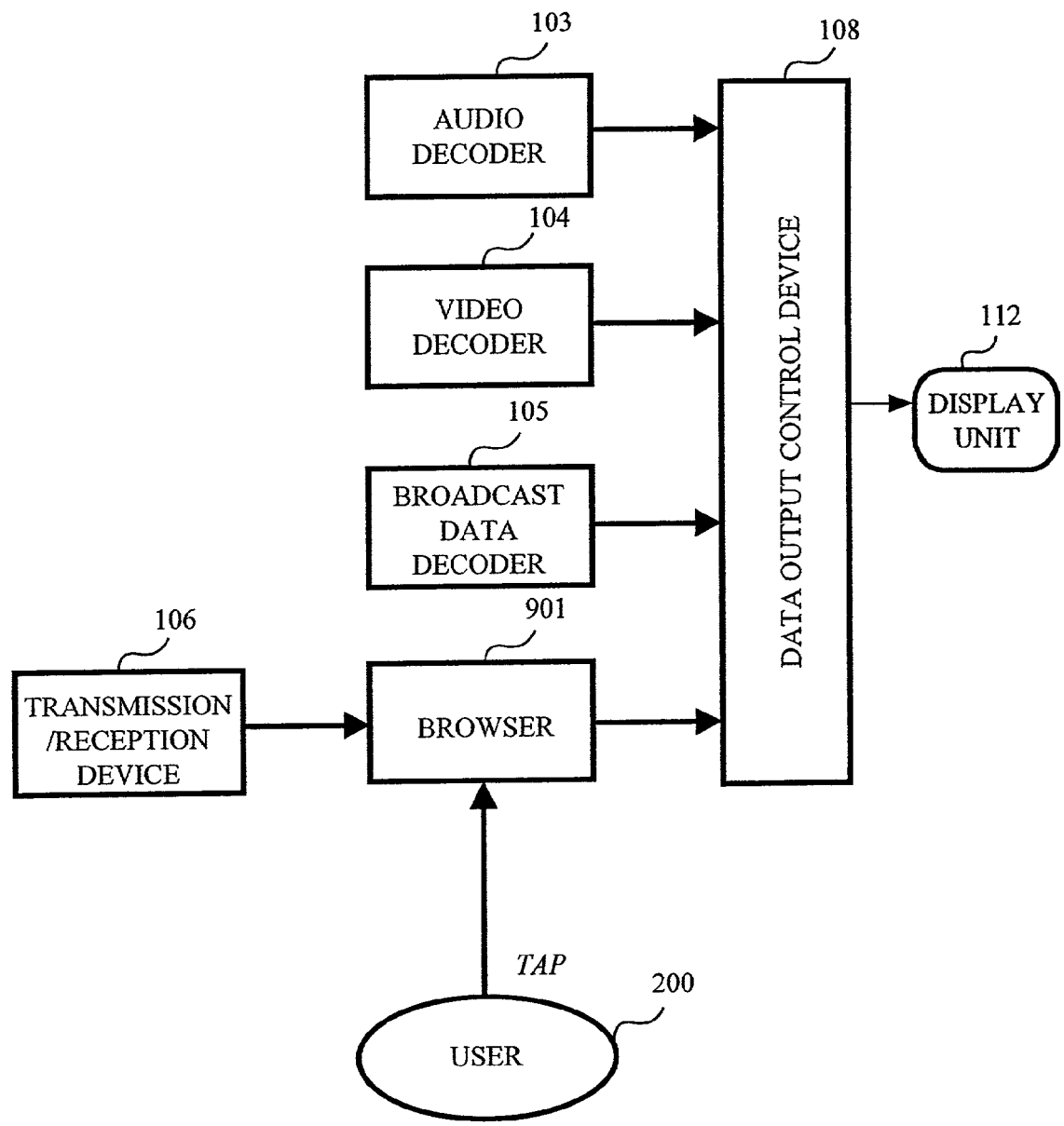
FIG. 9 is a diagram showing a portion of a general functional block of a portable terminal in a fourth embodiment.

First, FIG. 9 is a diagram showing a portion of a general functional block diagram of a portable terminal in the fourth embodiment. Specifically, the network data decoder 107 in the aforementioned first embodiment is replaced with a browser 901 which is an embodiment of a network data decoder.

In giving an example herein, assume that the browser 901 acquires, for example, a certain home page through the transmission/reception device 106, and that the user is browsing an overlay of the home page and a video data (sport program), on the display unit 112.

Assume that the user is mainly browsing data on the home page output from the browser 901 on the display unit 112, but the sport program, which is a different content from the home page, is overlaid on the home page with its display luminance reduced. In this event, while the user is mainly browsing the home page, at the time a fine play or the like was present, for example, in the sport program, the user views the sport program by, on the contrary, increasing the display luminance of the sport program and reducing the display luminance of the home page, as previously described.

Assume herein that the user first selects (taps) a link information or the like described on the currently browsed home page, for example, through the display device 112. In this event, the selection is communicated to the browser 901, and the browser 901, upon receipt of the selection, attempts to receive data corresponding to the selection, for example, data on a home page which is the destination of the link, through the transmission/reception device 106. In this event, prior to the reception, the browser 901 transmits a notice of the reception of the data on the home page from then on to the data output control device 108.

Upon receipt of "the notice of the reception of the data on the home page", the data output control device 108 changes output parameters so as to reduce the display luminance of a pull-type content input from the browser 901.

Figure 7A:
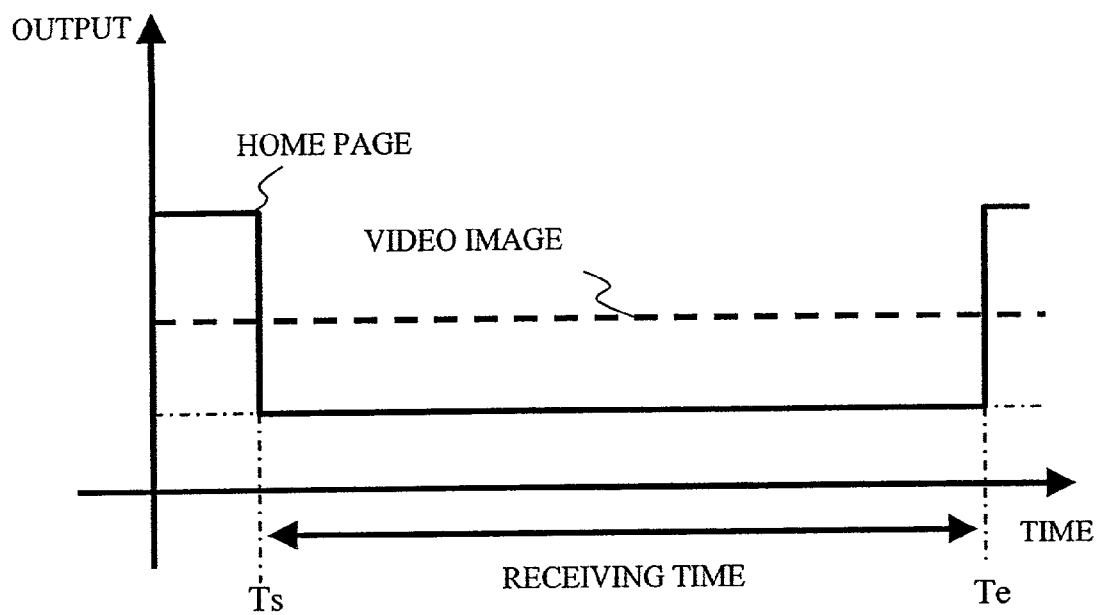
FIGS. 7A, 7B are first diagrams showing a relationship of output between a home page and a video data.

FIG. 7A shows a relationship between a change in the output parameters by the data output control device 108 and respective contents (a home page and a video image) displayed on the display unit 112.

Specifically, assuming that the output control device 108 has received "the notice of the reception of the data on the home page" at a time Ts, the display luminance of the home page is lower than that of the video image output at the time Ts. In this way while the browser 901 is receiving the reproduced data of the pull-type content, the video image is made be higher in display luminance than the home page, causing the user's consciousness to transition from the home page to the video image.

Next, as the browser 901 has received the data on the home page at a specific time Te, the browser 901 notifies the data output control device 108 of the completion of the reception of the home page. Upon receipt of the notice of "the completion of the reception of the home page", the data output control device 108 changes the output parameters to return the display luminance of the home page to the state prior to the time Ts at the time Te.

In this way, the user's consciousness again transitions from the video image to the home page.

In the foregoing manner, during the acquisition of a pull-type content, by changing the output parameters to reduce the output of the reproduced data corresponding to the pull-type content, it is possible to draw the user's consciousness to a content that is different from the content which is being acquired. It is therefore possible to reduce the uncomfortableness of the user to a waiting time required to acquire the pull-type content.

Figure 7B:
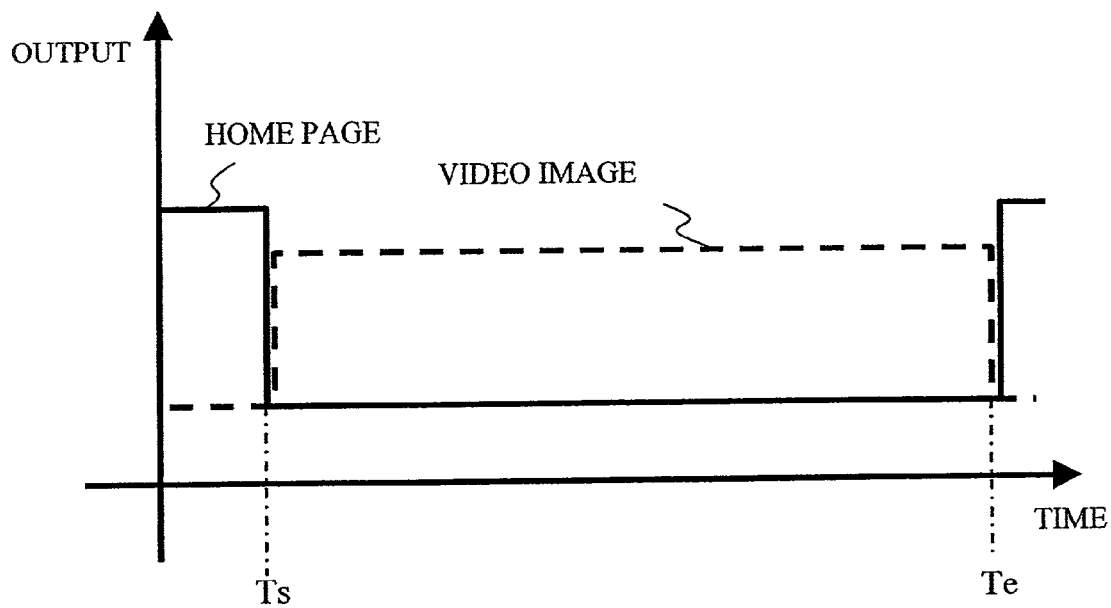

In the foregoing description, the display luminance of the video image is not reduced while the display luminance of the home page is reduced. Alternatively, as shown in FIG. 7B, for example, the output parameters may be changed to increase the display luminance of the video image as well as to reduce the display luminance of the home page. In this way, the user's consciousness can be further drawn to the video image.

As applications of the foregoing example, the following outputs may be produced.

Figure 10:
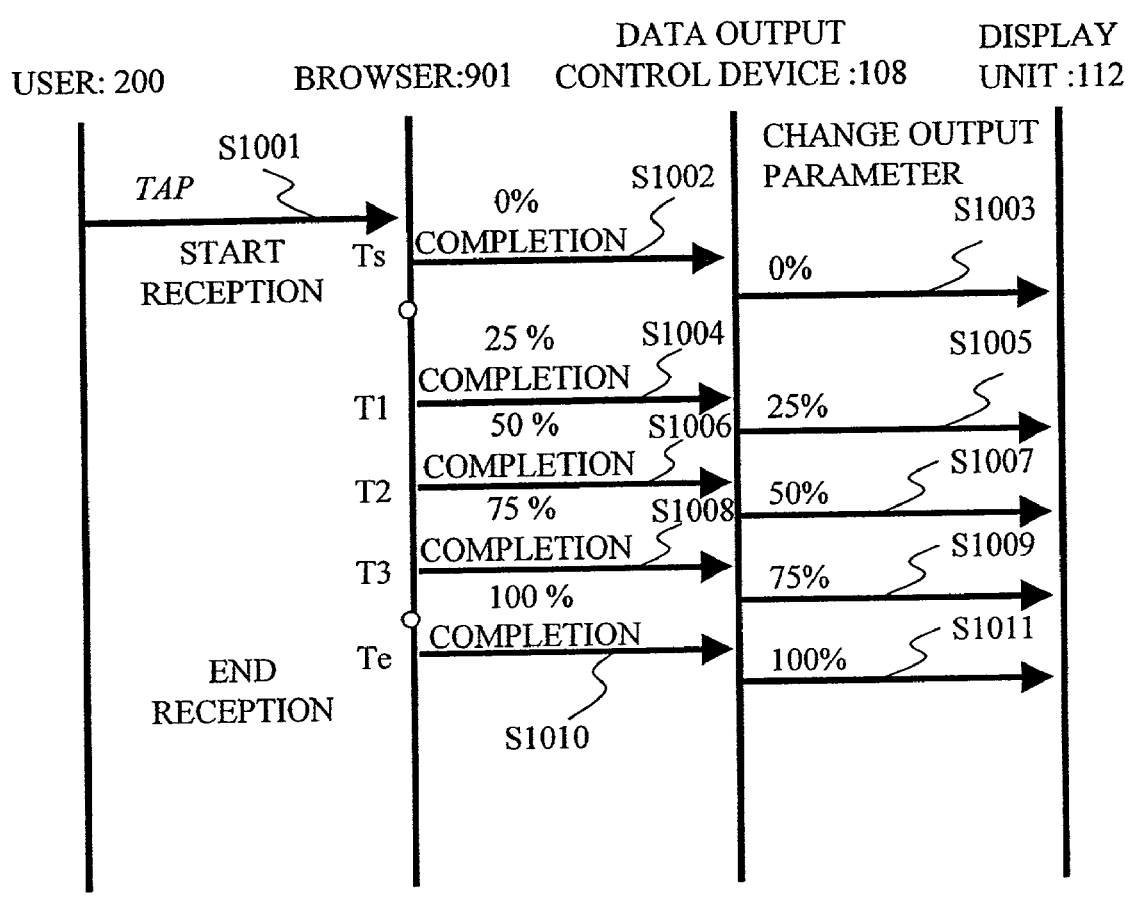
FIG. 10 is a flow chart of the processing in the reception of a pull-type content.

Specifically, as the user instructs the browser 901 to acquire a pull-type content, for example, by selecting the display unit 112, the browser 901 transmits a current reception progress situation to the data output control device, notifying that "the data of the home page is received" at the time Ts (S1001→S1002 in FIG. 10). Upon receipt of the notice of "the reception of the data of the home page" and the current reception progress situation, the data output control device 108 changes the output parameters to reduce the output of the home page (S1003 in FIG. 10).

Figure 8:
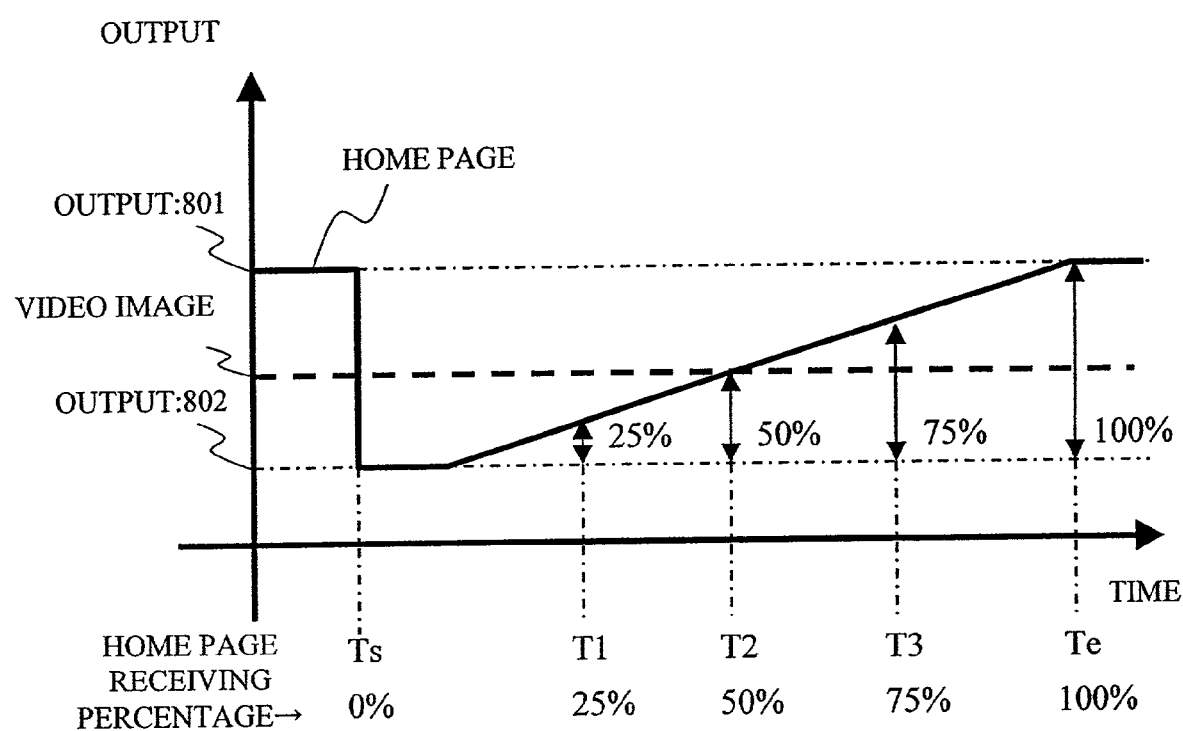
FIG. 8 is a second diagram showing a relationship of output between a home page and a video data.

FIG. 8 shows a relationship of the output between the video image and the home page.

Specifically, it can be seen that the output of the home page, which was initially an output 801, is reduced to an output 802 at the time Ts. Assume that the output indicated by the output 802 is 0%, and the output indicated by the output 801 is 100%.

Next, the browser 901 sequentially transmits a home page receiving situation to the data output control device 108. For example, when 25% of the home page has been received at a time T1, the data output device 108 is notified to that effect, and the data output control device 108 changes the output parameters to increase the output of the home page by 25%, and outputs to the display unit (S1004→S1005 in FIG. 10).

In a manner similar to the foregoing, when 50% of the home page has been received at a time T2, the output of the home page is increased to 50% at the time T2. When 75% of the home page has been received at a time T3, the output of the home page is increased to 75% at the time T3 (S1006→S1011 in FIG. 10).

Finally, when 100% of the home page has been received at a time Te, the output of the home page is increased to 100%, i.e., the output 801 (S1010→S1011 in FIG. 10).

In the foregoing manner, during acquisition of a pull-type content, the output parameters are changed such that the output of reproduced data constituting the pull-type content is increased in accordance with the pull-type content receiving situation (acquiring situation), thereby making it possible to notify the user of the content receiving situation by utilizing the output as well as to reduce the uncomfortableness of the user to a waiting time.

In the example in which the pull-type content is a home page, the output is changed by the amount of data. When the pull-type content is, for example, an electronic mail, the number of received mails with respect to the number of unreceived mails at the start of reception may be reflected to the output.

Fifth Embodiment

Next, another example in which the output parameters for reproduced data are dynamically changed in accordance with a situation will be described with reference to FIGS. 11 through 13.

Figure 12:
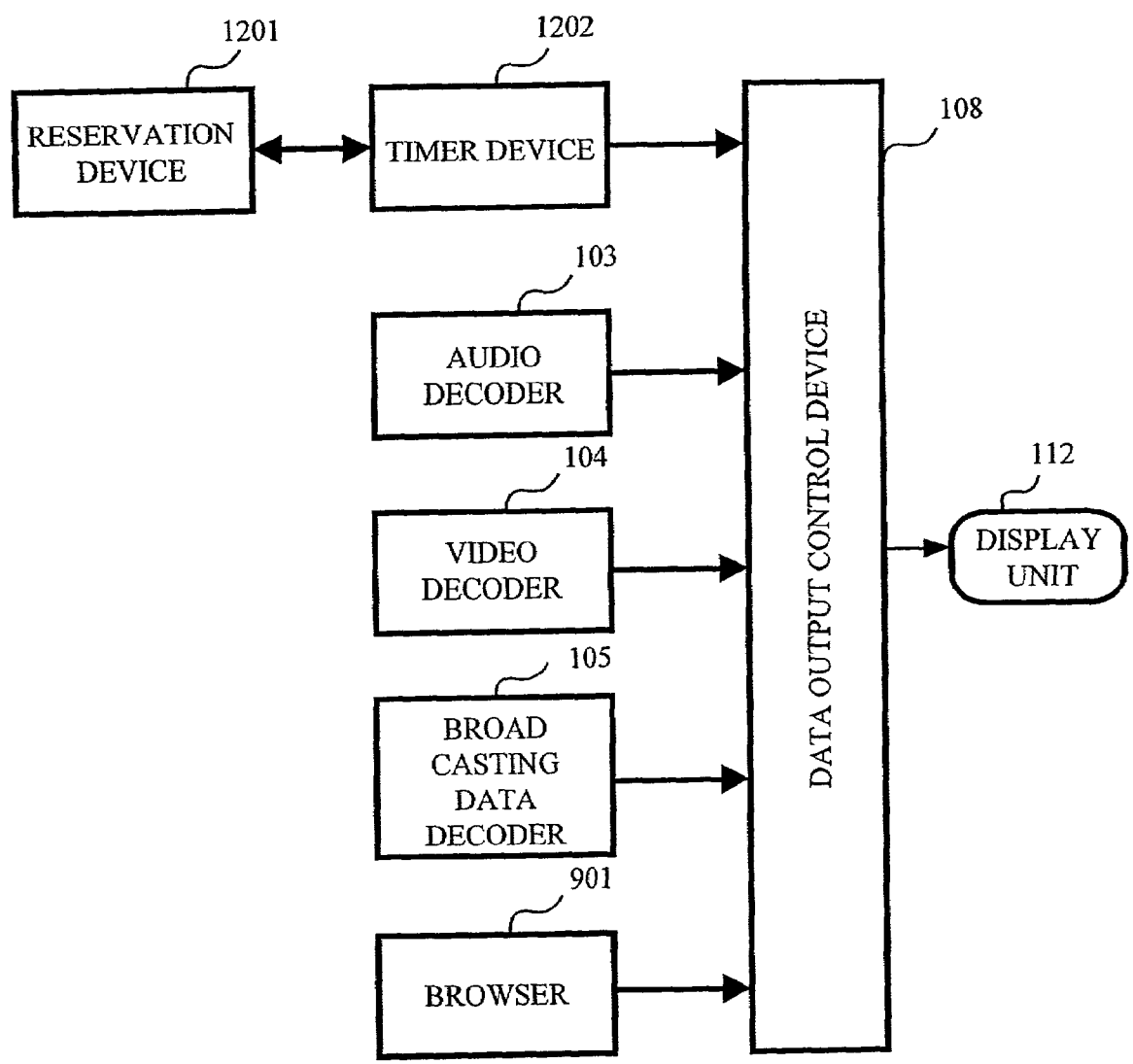
FIG. 12 is a diagram showing a portion of a general functional block of a portable terminal in a fifth embodiment.

First, FIG. 12 is a diagram showing a portion of a general functional diagram of a portable terminal in a fifth embodiment. Concretely, the mobile terminal includes a reservation device 1201 and a timer device 1202 in addition to the configuration of the portable terminal 100 in the aforementioned first embodiment.

In giving an example herein, assume that the reservation device 1201 has previously stored a start time, a reserved channel, and an end time of a television program to be viewed by the user. A setting procedure for the storage is not particularly related to the present invention, so that details thereon are omitted.

The user is mainly browsing a home page output from the browser 901 on the display unit 112, in a manner similar to the aforementioned fourth embodiment, but overlays the video image, which is a content different from the home page, on the home page with a reduced display luminance.

Figure 13:
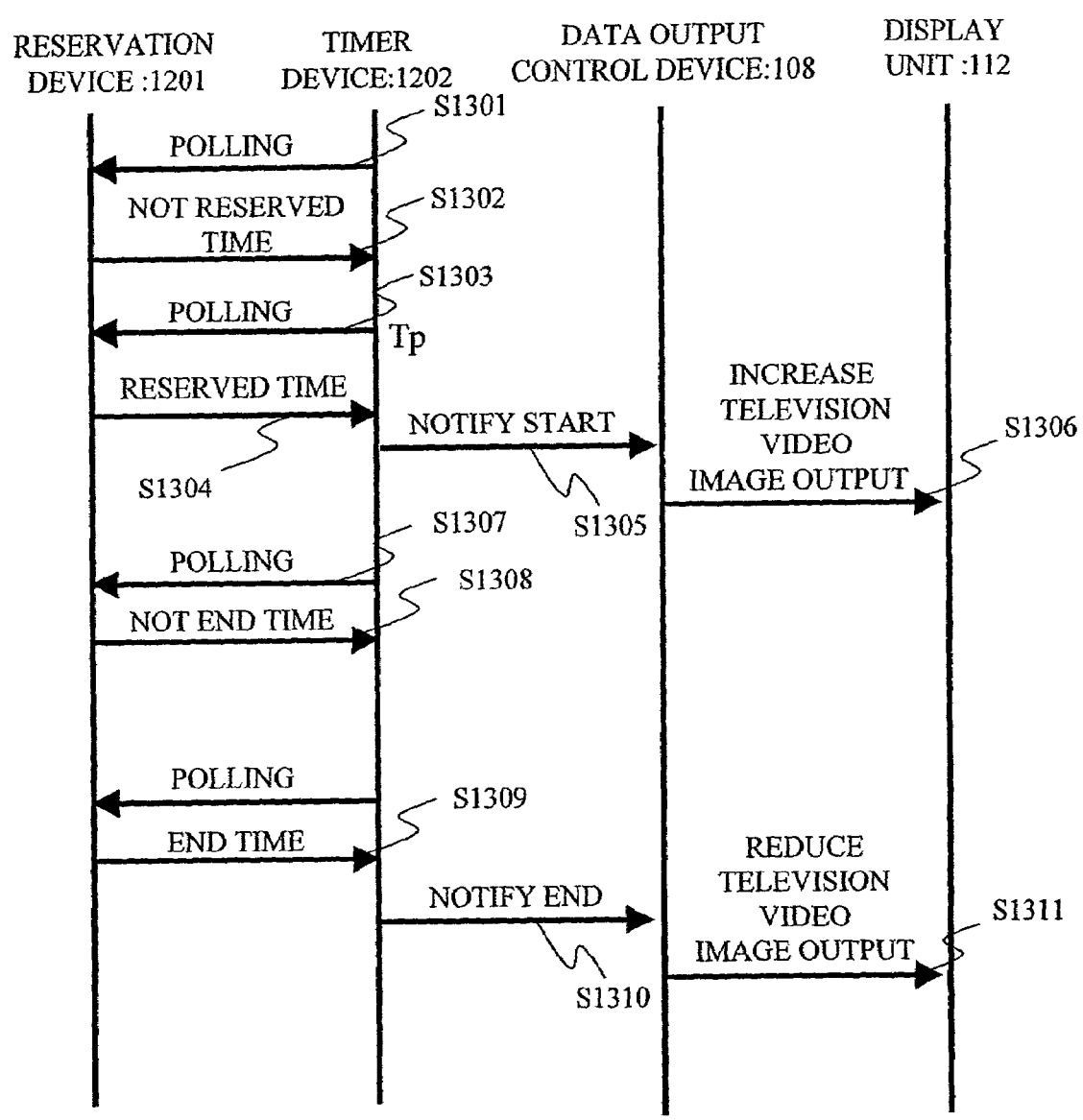
FIG. 13 is a flow chart of the processing for changing output parameters in accordance with the time.

Here, the timer device 1202 first queries (polls) the reservation device 1201 (S1301 in FIG. 13). In this event, the reservation device 1201, which has received the polling, returns a replay to the timer device 1202 if the set start time of the television program has not been reached (S1302 in FIG. 13).

Here, the polling is performed at a time Tp, and if there is the set start time for the television program, the reservation device 1201 notifies the timer device 1202 of the effect, and transmits the reserved channel to the timer device 1202 (S1303→S1304 in FIG. 13).

As the timer device 1202 is notified of the start time, the timer device 1202 notifies the data output control device 108 of the start time, and transmits the reserved channel to the data output control device 108 (S1305 in FIG. 13).

Upon receipt of the start time and the reserved channel, the data output control device 108 changes the output parameters for reproduced data which constitutes the video image to increase the display luminance of the video image on the reserved channel, for example, displayed currently on the display unit 112. The data output control device 108 also processes the reproduced data based on the changed output parameters and outputs the processed reproduced data to the display unit 112 (S1306 in FIG. 13).

Figure 11:
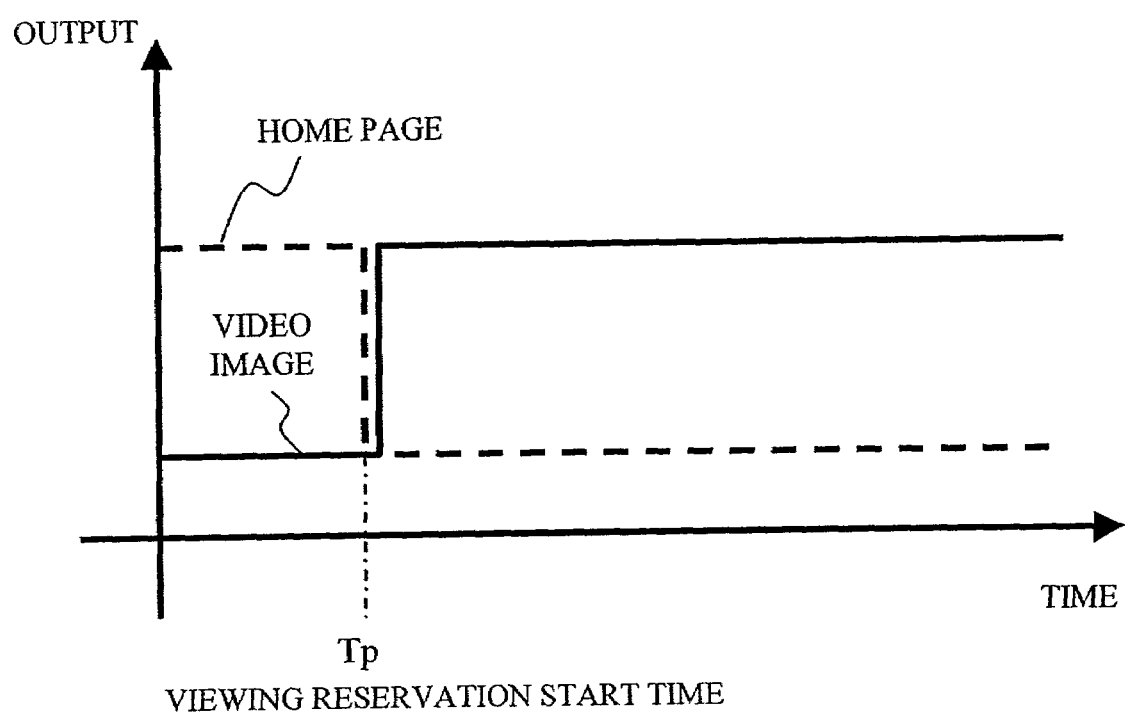
FIG. 11 is a third diagram showing a relationship of output between a home page and a video image.

FIG. 11 shows a relationship between the change in the output parameters by the data output control device 108 and respective contents (home page and video image) displayed on the display unit 112.

Specifically, it can be seen that the display luminance of the video image is increased at the start time Tp. On the other hand, for example, associated with the change in the output parameters for the video image (reproduced data), the output parameters for the home page may be changed to reduce the display luminance of the home page. In this way, the user's consciousness transitions from the home page to the video image.

Subsequently, the timer device 1202 queries the reservation device 1201, and the reservation device 1201 judges the previously set end time (S1307 in FIG. 13).

Here, if the end time has not been reached, the timer device 1202 is notified to that effect (S1307 in FIG. 13).

When the end time is reached, the timer device 1202 is notified to that effect, and the timer device 1202, which has received the notification, notifies the data output control device 108 to that effect (S1309→S1310 in FIG. 13).

The data output device 108, upon receipt of the notification of the end time, changes the output parameters, respectively, such that the display luminance of the video image and the display luminance of the home pages, for example, are the same as those at the time Tp.

The data output control device 108 also processes the reproduced data based on the changed output parameters, and outputs the processed reproduced data to the display unit 112 (S1311 in FIG. 13). In this way, the user's consciousness again transitions from the video image to the home page.

In the foregoing manner, by providing the timer device and the reservation device, the output parameters can be set in accordance with a predetermined time. In this way, the user's convenience can be improved.

Sixth Embodiment

Next, the processing of readily using output parameters set by the user will be described in a six embodiment with reference to FIGS. 1, 4 and 5.

In the sixth embodiment, the portable terminal 100 additionally includes a parameter storage device 110 which previously stores a variety of combination of output parameters (see FIG. 1).

In FIG. 4, a "set name" 407 table stores names which make the user understand in which case the setting is effective, specifically, "initial value", "TV", "electronic mail", "indoor", "outdoor" and the like.

First, in the portable terminal 100 in FIG. 1, a desired item, for example, "TV" can be set from the set name 407 by a specific manipulation of the user. Specifically, a menu button (not shown) is pressed down to display a "set change menu" and the like on the display unit 112 in FIG. 1, and a desired set name is selected using the cross key 503 in FIG. 5.

As the user selects an intended set name, the setting device 109 in FIG. 1 reads settings corresponding to the set name, i.e., output parameters for audio data, video data, character data and network data, respectively. Subsequently, the setting device 109 transmits the read output parameters to the data output control device 108 in FIG. 1.

Specifically, for example, when the user selects "electronic mail", the setting device 109 reads an output parameter 406 which sets the luminance of an output parameter associated with digital broadcasting (broadcasting data 400) to be low and sets the luminance of an output parameter associated with the network data to be high.

Subsequently, in a manner similar to the processing described in the aforementioned first embodiment, the output parameter applies a specific effect to the respective output data, and then the reproduced data are overlaid.

In the foregoing manner, by providing the parameter storage device for previously storing output parameters suitable for each situation, and allowing the user to use an output parameter, the user can readily set a suitable output parameter for reproduced data.

By allowing the user to freely change the acquired parameter, the user can customize the output parameter as he likes, and set an overlay output. Further, since the setting device 109 can store the customized output parameter in the parameter storage device 110, the user can set a preferred output parameter as appropriate.

Seventh Embodiment

In the respective embodiments described above, a change in output parameters is determined by the user. However, the determination of output parameters need not be limited to input by the user, so that another method of inputting output parameters will be described below, with reference to FIGS. 1 and 4.

First, output parameters may be input from the broadcasting decoder 105.

By permitting output parameters to be input from the broadcasting decoder 105, the respective output parameters can be set from the position of transmitting the broadcasting. When video data is displayed at a reduced luminance and the audio data output is also reduced, the user may not notice urgent news or the like for communicating a tsunami warning and a place of refuge, for example, when a natural calamity such as earthquake has occurred. In such an event, as the broadcasting transmitting side changes the output parameters such that the urgent news and the like can be efficiently communicated to the user. Also, a large amount of defined parameters can be distributed at one time through the broadcasting in addition to the ability to control the display for the user based on an intention of he broadcasting transmitting side.

Alternatively, in place of an input from the broadcasting decoder 105, output parameters from the network decoder 107 may be input to produce similar effects.

Further alternatively, the portable terminal 100 may be provided with a memory card interface which is connected to a memory card (external storage medium) which stores output parameters, such that the setting device 109 reads the output parameters set in the memory card. Of course, the setting device 109 may write the memory card.

In this configuration, the user can transmit, receive and distribute output parameters by storing preferred output parameters in the memory card, and passing the memory card to other persons.

Further alternatively, the portable terminal may be provided with a (handy) scanner, wherein output parameters may be input to the setting device 109 by reading the output parameters which may be printed as bar codes or numerical values, for example, on a magazine, a book or the like.

Further alternatively, data acquired from an optical sensor and related to the brightness of an environment in which the terminal is referenced may be input, so that the setting device 109 determines output parameters based on the data on the brightness.

For example, a displayed content is relatively perceivable within doors even if a "luminance" parameter is slightly reduced. However, if the portable terminal is brought outdoors with the output parameter left reduced, the displayed content may be perceived with difficulties due to a dark display. The same is true for the day and night. In such a case, an overlay output can be automatically provided for the user to be readily perceivable by changing the "luminance" parameter and the "color" parameter based on the data related to the brightness acquired from the optical sensor. Rather than changing the output parameter based on the data related to the brightness, the set name 407 may be selected.

Further alternatively, positional data of the terminal acquired from a GPS (Global Positioning System) may be input to change a setting of a parameter based on the positional data or to select the setting 405.

The following may be contemplated as an utilization method using the GPS. Specifically, for example, positional data (range) of a predetermined region, and information particular to the region may be transmitted in digital broadcasting. In such a case, the setting device 109 compares, for example, the positional data received from the GPS with the positional data of the predetermined region, and changes the "luminance" parameter and the "color" parameter of the information particular to the region, when determining that the user is located within the positional data of the predetermined region, thereby prominently displaying the information particular to the region.

In the foregoing manner, the portable terminal 100 can change the overlay output based on the positional data.

Further alternatively, for example, with a car-equipped portable terminal, speed data (speed information) acquired from a speed sensor may be input to the portable terminal 100 to change settings of output parameters based on the speed data or to select the set name 407.

The following may be contemplated as a utilization method using the speed sensor. Specifically, for example, the volume of audio data is kept constant, and displayed video data and character data on the display unit are faded out as the moving speed becomes higher to prevent dangerous inattentive driving.

Alternatively, a moving amount per unit time, i.e., speed may be calculated from the positional information acquired from the GPS.

While the embodiments of the present invention reference a movable portable terminal, the present invention is applicable to a terminal for use in a fixed environment as well as to a mobile environment.

As described in the above-mentioned embodiments, the present invention provides following merits.

The user can arbitrarily set an overlay output distribution for video data, audio data, broadcasting data (character data) and network data in accordance with his taste, and can change the luminance of particular video data and the like, so that video data and character information can be overlaid in accordance with the user's taste, i.e, the preference of the user.

Also, when one reproduced data output is increased (changed) while another reproduced data output is decreased (changed), assuming that two types of contents, for example, are being reproduced, the output of the other content (content which need not be mainly viewed) can be automatically reduced in response to an increase in the output of the content which is desired to be mainly viewed.

Further, when one reproduced data output is increased (changed) while another reproduced data output is also increased (changed), for example, when an output of video data of one content is increased, an output of audio data which is reproduced data of the same content can be increased.

In this way, efficient manipulations can be provided for changing the overlay output.

Further, when reproduced data constitutes a pull-type content, the setting device may set output parameters so as to reduce an output of reproduced data constituting the content during acquisition of the content, thereby reducing uncomfortableness of the user to a waiting time required to acquire the pull-type content.

Further, in accordance with a pull-type content receiving situation, output parameters may be changed so as to increase an output of reproduced data which constitutes the content, thereby notifying the user of the content receiving situation utilizing the output.

Further, output parameters suitable for each situation may be previously stored in the parameter storage device to allow the user to use the output parameters, so that the user can readily set suitable output parameters for reproduced data.

Furthermore, the setting device may set output parameters based on information acquired from the broadcasting data decoder or set output parameters based on information acquired from the network data decoder, thereby distributing a large amount of defined output parameters at one time through broadcasting, as well as controlling the user's display based on an intention of the broadcasting transmission side.

What is claimed is:

1. A portable terminal for simultaneously, displaying display data contained in a plurality of contents acquired from a plurality of information sources, the portable terminal comprising:

a receiving unit operable to receive pull-type data of the display data and operable to receive broadcasting data of the display data;

a setting unit operable to set luminance or color for the respective display data, the luminance or the color being a display parameter related to display of the display data; and a data output control unit operable to process the display data based on the luminance or color set by the setting unit and display the processed display data, wherein the setting unit increases the luminance or color of the display data included in the pull-type data based on increase of a proportion of the pull-type data being received to the total amount of the pull-type data to be received, and reduces the luminance or color of the display data included in the broadcasting data in response to the increase of the luminance or color of the pull-type data, and the data output control unit simultaneously displays the pull-type data and the broadcasting data overlaid on one display based on the luminance or color changed by the setting unit.

2. The portable terminal according to claim 1, wherein the pull-type data is data downloaded through a network, and the setting unit increases the luminance or color of the display data included in the data downloaded based on a proportion of the data downloaded to the total amount of the data to be downloaded, as well as reduces the luminance or color of the display data included in the broadcasting data.

3. The portable terminal according to claim 1, wherein the pull-type data is electronic mail data, and the setting unit increases the luminance or color of the display data included in the electronic mail data based on a proportion of the electronic mail data being received to the total amount of the electronic mail data to be received, as well as reduces the luminance or color of the display data included in the broadcasting data.

4. A method for outputting display data with a portable terminal for simultaneously displaying display data contained in a plurality of contents acquired from a plurality of information sources, said method comprising the steps of:

receiving pull-type data of the display data;

receiving broadcasting data of the display data;

increasing the luminance or color of the display data included in the pull-type data based on increase of a proportion of the pull-type data being received to the total amount of the pull-type data to be received, and reducing the luminance or color of the display data included in the broadcasting data in response to the increase of the luminance or color of the pull-type data; and simultaneously displaying the pull-type data and the broadcasting data overlaid on one display based on the changed luminance or the color.

5. A computer program product having a computer readable medium bearing a program, which when executed causes a computer to perform the steps of:

receiving pull-type data of the display data;

receiving broadcasting data of the display data;

increasing the luminance or color of the display data included in the pull-type data based on increase of a proportion of the pull-type data being received to the total amount of the pull-type data to be received, and reducing the luminance or color of the display data included in the broadcasting data in response to the increase of the luminance or color of the pull-type data; and simultaneously displaying the pull-type data and the broadcasting data overlaid on one display based on the changed luminance or the color.

* * * * *